No. 635,657. Patented Oct. 24, 1899.
C. F. CHURCH.
VEHICLE WHEEL.
(Application filed Oct. 4, 1897.)
(No Model.) 2 Sheets—Sheet 1.

Witnesses:
William H. Baxter.
Arthur B. Jenkins.

Inventor:
Charles F. Church
by Chas. L. Burdett,
attorney

No. 635,657. Patented Oct. 24, 1899.
C. F. CHURCH.
VEHICLE WHEEL.
(Application filed Oct. 4, 1897.)
(No Model.) 2 Sheets—Sheet 2.
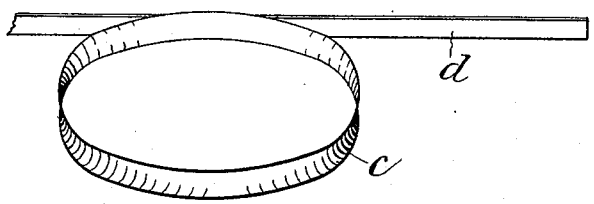
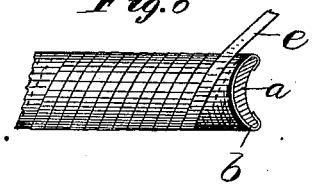
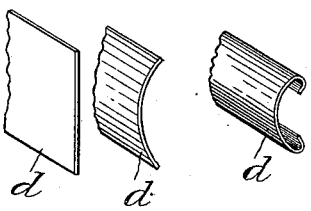
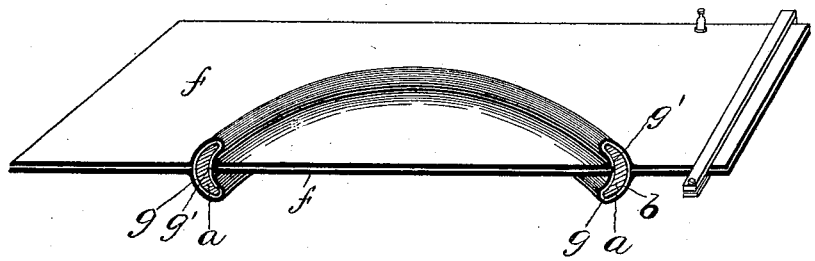
Witnesses: William H Barker. Arthur B Jenkins.
Inventor: Charles F. Church by Chas L. Burdett, attorney

UNITED STATES PATENT OFFICE.

CHARLES F. CHURCH, OF NEWARK, NEW JERSEY.

VEHICLE-WHEEL.

SPECIFICATION forming part of Letters Patent No. 635,657, dated October 24, 1899.

Application filed October 4, 1897. Serial No. 653,994. (No model.)

*To all whom it may concern:*

Figure 1:
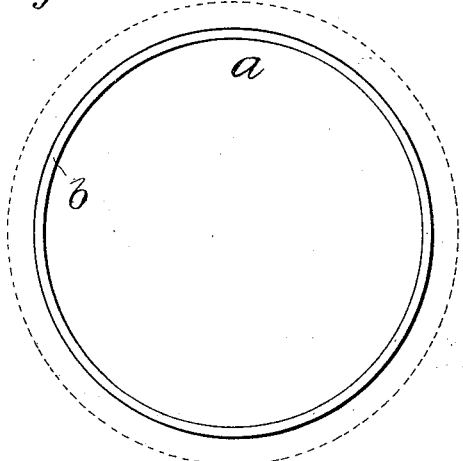
Figure 2:
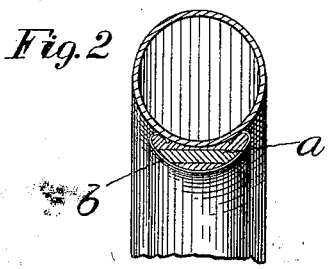
Figures 3, 5:
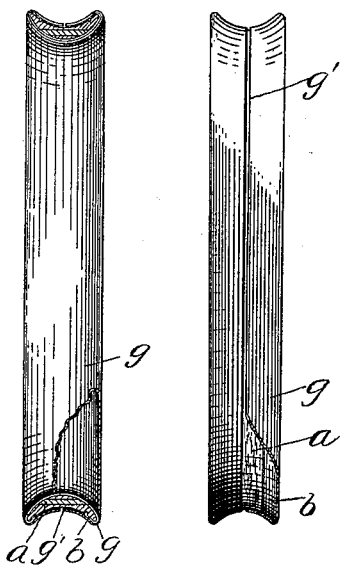
Figure 4:
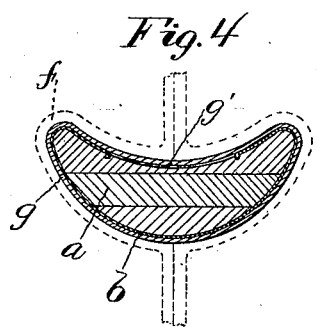

Be it known that I, CHARLES F. CHURCH, a citizen of the United States, and a resident of Newark, in the county of Essex and State of New Jersey, have invented certain new and useful Improvements in Vehicle-Wheels, of which the following is a full, clear, and exact description, whereby any one skilled in the art can make and use the same.
My invention relates to the art of covering articles, whether of wood, metal, or other solid substance, with a film or thin protective layer of celluloid or like material; and the object of my invention is to produce an article, as a wheel-rim, provided with the protective layer of celluloid united to the body of the article in such manner as to secure an intimate and durable connection between the materials.
Referring to the drawings, Figure 1 is a view in side elevation of a wheel-rim produced in accordance with my invention. Fig. 2 is a view in transverse section of the rim and a pneumatic tire attached thereto. Fig. 3 is a view in cross-section of the rim with the film-blank and a shield placed on the rim and with parts broken away to show construction. Fig. 4 is a sectional view, on enlarged scale, cut through the rim transversely and through the blank film and the shield with a bag in dotted outline. Fig. 5 is a view of the concave face of the rim with a shield in place. Fig. 6 is a view showing the manner of forming the film-blank. Fig. 7 is a perspective view of a portion of the blank film, illustrating its general outline. Fig. 8 is a view in section through the rim, showing the manner of wrapping to conform material to rim prior to attaching the shield in the process of producing the covered rim. Fig. 9 is a perspective view of an air-tight bag in lengthwise section through the bag and the rim, illustrating the relative position of these parts when the air is exhausted from the bag and the rim is under pressure from the outside.

In producing my improved article I make use of an apparatus and of means which form the subject-matter of another application, Serial No. 653,997, filed October 4, 1897, and such parts are described and referred to herein for the purpose of making clearer the specific and peculiar features of the article which forms the subject-matter of the present case.

In the accompanying drawings, the letter *a* denotes a wheel-rim, which may be of any ordinary material, although preferably of wood and of the form herein shown. It is a rim particularly adapted for use on a bicycle, velocipede, or like vehicle, being of a crescent shape in cross-section in general outline, with rounded edges.

The letter *b* denotes the covering-layer of celluloid or like material, which is applied and firmly united to the rim across the back and edges, but stops short of meeting on the face of the rim as usually produced. The covering layer or film of celluloid may extend completely about the rim, so as to protect all portions of it; but owing to the fact that the face of the rim is supplied with a tire which protects and covers it from view, the rim for the purpose of my invention is preferably covered in part only, as described. A further object in leaving the central portion of the tire-socket uncovered by celluloid is to provide for the tire-cement a surface of wood, to which the cement will adhere more firmly as a means of attaching the tire than it would to the smooth and denser celluloid film.

In order to produce a wheel-rim or other article, the blank of celluloid or like material is cut in a strip of a length equal to the circumference of the rim and of a width which will enable it to be extended across the back and over the edges and a short distance toward the center. This strip is then placed upon an annular form *c*, which has a concave periphery, and dipped into hot water and stretched upon the form, which causes the strip to take the proper transversely-curved shape and also the ring or annular shape to conform roughly to the shape this film will assume when placed upon the rim. The strip thus roughly drawn to shape and with the parts stretched so as to avoid any chance of wrinkling in its final application to the rim constitutes the blank *d*. The surface of the rim *a* to which the blank is to be secured is preferably coated with a suitable cement, and the blank is then applied and held in place with strips *e* of rubber wound continuously about the rim. A certain degree of tension of the rubber-holding strip is made use of, so that under the compression the material may be drawn tighter about and upon the surface of the rim as soon as the covering material, as celluloid, is softened. The rim, covered with the blank held in place by the rubber strips, is put into an air-tight rubber bag, as f, the openings closed, the air withdrawn, and the whole placed in hot water for a limited time. After the rim has been subjected to this heating operation under pressure for a few minutes it is removed from the bath, taken from the bag, and the rubber strips are removed.

In the method employed in the prior art for covering a strip of molding with celluloid such a strip, with the celluloid layer placed upon it, is put into a bag and the air exhausted; but in doing this it is obvious that there must be a fullness of the bag, which leaves surplus material over and above that required to completely inclose the strip, and this surplus of the bag is called the "pull-up." If this seam is located along the surface of the covering-layer of celluloid, a ridge is formed when the pressure is applied to cause an intimate contact between the surface of the molding and the covering-layer of the celluloid. The presence of such a seam and of ridges and marks in the covered article has formed an insurmountable obstacle to the production of celluloid-covered articles by this old process in a mercantile form and at a price which would make them salable in all except a few limited instances. These limitations in the practice of prior methods which produced a ridge or seam liable to be cut through in finishing the article, and thus leaving exposed an edge of the film to the danger of chipping or of taking fire on exposure to a sufficient degree of heat, are entirely removed by my improvement, which consists in the employment of a shield g, which is a covering-layer, made, preferably, of india-rubber, of the precise shape of the article being covered and so made as to be easily wrapped about it and meeting at abutting edges, which form a continuous but extremely narrow opening g' along one side of the shield. After the rim has been taken from the bath and the rubber strips removed the shield is adjusted upon the rim, which is then put into the bag, locked up therein by closing the opening, and the air exhausted. This bag containing the rim is put into a pressure-chamber of strong material, preferably and usually iron, which is capable of being hermetically sealed and provided with coils of steam-pipe for heating water, with which such chamber is filled. As soon as the bag and the contained rim have been closed up within this chamber it is filled with water and the temperature raised to about 212° Fahrenheit, this heating operation subjecting the bag and its contents to considerable pressure, varying from seventy-five to one hundred and fifty pounds or more per square inch, depending on the nature of the material being covered—that is, whether of wood or metal. The pressure varies also with different grades of material. After a short time, depending upon the size and shape of the article being treated, the hot water is withdrawn and cold water pumped into the chamber. When cooled, the bag is withdrawn from the chamber and the rim from the bag, the shield is removed, and the celluloid covering polished, as by means of sandpaper and a buffing-wheel.

By the means described the covering-layer of celluloid is smoothly and firmly united to the surface of the rim, and so intimate is the union that it is impossible by ordinary usage or treatment and even by more than ordinary abuse to chip off, crack, or break through this covering-layer.

The wheel-rim produced by the method described and composed of the core and the covering-layer of celluloid is stronger, more resilient, more durable, and capable of withstanding use in all conditions of weather to a degree not possible with a wooden rim or either with a metallic rim. The wooden rim is protected against splitting to a large degree, as well as against any transverse breaking strain and also against any chance or danger of rotting owing to alternate wetting and drying to which a vehicle-wheel rim is exposed in use.

I claim as my invention—

1. As an improved article of manufacture, a wooden rim for a bicycle-wheel having a concaved face, a layer of celluloid or like material united with the wheel and having any rim or seam located on the concaved face.

2. As an improved article of manufacture, a wooden rim for a bicycle-wheel having a concave face, a layer of celluloid or like material united with the back and sides of the rim leaving the central portion of the concaved face of the rim uncovered, and a tire cemented in the socket in the rim, all substantially as described.

CHARLES F. CHURCH.

Witnesses:
FELTON PARKER,
HERMAN F. CURTZE.